United States Patent [19]
Ishikawa

[11] Patent Number: 6,109,865
[45] Date of Patent: Aug. 29, 2000

[54] PORTABLE AIR-BLOWING WORKING MACHINE

[75] Inventor: Takeshi Ishikawa, Tokyo, Japan

[73] Assignee: Kioritz Corporation, Tokyo, Japan

[21] Appl. No.: 09/191,820

[22] Filed: Nov. 13, 1998

[30] Foreign Application Priority Data

Nov. 14, 1997 [JP] Japan ................................. 9-313767

[51] Int. Cl.$^7$ ................................................. F01D 1/12
[52] U.S. Cl. ............................................ 415/98; 415/58.1
[58] Field of Search ................................ 417/234, 350,
417/423.1, 423.5; 415/54.1, 57.2, 57.3,
57.4, 58.1, 59.1, 98–100

[56] References Cited

U.S. PATENT DOCUMENTS

| | | | |
|---|---|---|---|
| 4,451,951 | 6/1984 | Satoh | 15/330 |
| 4,523,896 | 6/1985 | Lhenry et al. | 417/244 |
| 4,644,606 | 2/1987 | Luerken | 15/330 |
| 4,725,196 | 2/1988 | Kaneki et al. | 415/100 |
| 4,929,149 | 5/1990 | Greenspan | 415/99 |
| 5,704,761 | 1/1998 | Kobayashi et al. | 415/182.1 |
| 6,004,093 | 12/1999 | Ishikawa | 415/98 |

FOREIGN PATENT DOCUMENTS

67802 3/1994 Japan .

*Primary Examiner*—Thomas N. Moulis
*Attorney, Agent, or Firm*—Baker Botts L.L.P.

[57] ABSTRACT

A portable air-blowing working machine includes a prime mover and an air-blowing system. The air-blowing system incorporates first-stage and second-stage centrifugal air-blowing sections, which are rotatably driven by an output shaft of the prime mover and are interconnected by an air-blowing passage for delivering air discharged from the first-stage air-blowing section to the intake of the second-stage. In operation, external air is drawn into the first-stage air-blowing section, increased therein in velocity and pressure, and then continuously discharged via the air-blowing passage to the second-stage air-blowing section, where the air is further accelerated and compressed before being finally discharged to the atmosphere.

9 Claims, 9 Drawing Sheets

PRIOR ART

PORTABLE AIR-BLOWING WORKING MACHINE

BACKGROUND OF THE INVENTION

1. Field of the Invention

This invention relates to a portable air-blowing working machine having a prime mover and a centrifugal air blower adapted to be rotatably driven by the prime mover. More specifically, the invention relates to such a portable air-blowing machine in which the centrifugal air-blower is embodied in two stages.

2. The Prior Art

Portable air-blowing working machines of the aforementioned type may, for instance, comprise portable air-blowing cleaners for collecting scattered debris, such as fallen leaves, dust and the like, or portable spraying machines for spraying chemicals.

FIG. 9 shows one example of a portable air-blowing cleaner of the aforementioned type of portable air-blowing working machine. The portable air-blowing cleaner 100 shown in FIG. 9 is of the back-pack type and is designed to produce a high velocity, compressed air stream so as to "sweep" and/or gather scattered debris, such as fallen leaves, dust and the like. Such a portable air-blowing cleaner 100, therefore, can advantageously be used in lieu of a conventional broom (See U.S. Pat. No. 5,052,073). As illustrated, the portable air-blowing cleaner 100 includes a U-shaped (in plan view) shouldering frame 12 to which a pair of shouldering straps 14 are connected, a centrifugal air blower 80 which is attached as an air-blowing system to the shouldering frame 12 via a vibration-damping pad (not shown), and an air-cooled two-stroke gasoline engine 20 which is directly attached as a prime mover behind the air blower 80 for rotatably driving the air blower 80.

The centrifugal air blower 80 is of the conventional single-stage type, and is designed to draw in external air, increase it in velocity and pressure, and discharge it as a high velocity air stream through a discharge port 85 that is formed on one side of the air blower 80 so as to extend obliquely downward. To this air-discharge port 85 are successively connected a bent pipe 91, a bellows type flexible pipe 92 and an exhaust pipe 95. On the upstream side of the exhaust pipe 95, there is mounted an operating handle 96 which is provided with manipulating members 97, such as a throttle valve control lever and a switch, for controlling the speed of the engine 20.

As mentioned above, according to the conventional portable air-blowing cleaner, a centrifugal air blower of the single-stage type has been employed as the air-blowing system. Recently, however, the noise generated by such conventional air-blowing cleaners has become a noise pollution problem. In some regions (California U.S.A, etc.) the enactment of regulations to prohibit the sale of such portable air-blowing working machine has been discussed.

Various countermeasures have been proposed to minimize the noise generated by conventional portable air-blowing working machines. One proposal is to cover the air blower entirely with a covering member lined with a noise-damping material. All of the countermeasures that have been proposed to date, however, have failed satisfactorily to minimize the noise output and/or have been accompanied by a degradation of desirable features of the portable air-blowing working machine, such as its light weight and compactness in size.

BRIEF SUMMARY OF THE INVENTION

The present invention has been made to cope with the aforementioned problems. It is therefore an object of the invention to provide a portable air-blowing working machine that is capable of drastically minimizing the noise generated by the machine, while providing a desired air discharge performance and, at the same time, minimizing any increase in weight and external size of the machine.

With a view to realizing the aforementioned object, the invention provides a portable air-blowing working machine which comprises a prime mover, such as an air-cooled two-stroke gasoline engine or an electric motor, and an air-blowing system having a two-stage air blower. Both stages comprise individual centrifugal air-blowing sections that are rotatably driven by an output shaft of the prime mover, and that are interconnected by an air-blowing passage. In operation, external air is drawn into the first air-blowing section, increased therein in velocity and pressure, and then continuously discharged via the air-blowing passage to the secondary, or second-stage, air-blowing section, within which the air is further accelerated and compressed before being finally discharged to the atmosphere.

The portable air-blowing working machine according to the invention may be constructed such that both the first air-blowing section and the secondary air-blowing section are positioned on the same side of the prime mover, or such that the first air-blowing section is positioned on one side of the prime mover and the secondary air-blowing section is positioned on the other side of the prime mover. In both embodiments, the first and second air-blowing sections are communicated with each other through one or a plurality of air-blowing passages.

In one preferred embodiment of the invention, both the first air-blowing section and the secondary air-blowing section are arranged such that the air-intake ports thereof open, or face, in the same axial direction. So arranged, the first air-blowing section and the secondary air-blowing section are coupled to each other in series and communicate with each other via the air-blowing passage.

In a more preferred embodiment of the invention, both the first air-blowing section and the secondary air-blowing section are arranged such that the air-intake ports thereof open, or face, in opposite axial directions. With this arrangement, the first air-blowing section and the secondary air-blowing section are coupled to each other in a back-to-back configuration and communicate with each other via the air-blowing passage.

Since the air blowing system of the invention is constituted by a two-stage system (comprising the first air-blowing section and the secondary air-blowing section) even if the revolution speeds of the prime mover and the two air-blowing sections are lowered as compared to the conventional single-stage air-blowing mechanism, an air-discharge performance is nonetheless provided which is comparable to that of the conventional single-stage mechanism. In accordance with the invention, therefore, the revolution speeds of the prime mover and the air-blowing sections can be reduced without sacrifice of air-discharge performance, but with the advantage that the noise produced by the air-blowing system can be drastically reduced and, at the same time, the vibration generated by the portable air-blowing working machine can be also reduced.

Furthermore, since the normal revolution speed of the prime mover can be lowered in accordance with the invention, wear of the moving parts of the machine can be also reduced, thus making it possible to prolong the life of the machine.

Since, as noted, the vibration of the machine can be reduced in addition to the reduction of noise, fatigue of the operator can be also alleviated.

Therefore, as compared with the prior art countermeasure of covering the air blower entirely with a covering member lined with a noise-damping material, the countermeasure afforded by the present invention is more advantageous in that the reduction of noise can be completely and effectively accomplished and, at the same time, there is no redundant cover member to interfere with the inspection and maintenance of the machine.

Also, when the first air-blowing section and the secondary air-blowing section are coupled to each other in the aforementioned back-to-back configuration, any increase in the size of the machine in the axial direction thereof can be minimized.

Moreover, since the static pressure can be increased with the two-stage air-blower of the invention, the diameter of the air-discharge port and of the pipes connected therewith can be minimized, thus making it possible to reduce the size and weight of the machine as a whole.

DETAILED DESCRIPTION OF PREFERRED EMBODIMENTS OF THE INVENTION

Various embodiments of the portable air-blowing working machine according to the invention are described in detail below with reference to the drawings.

Figure 1:
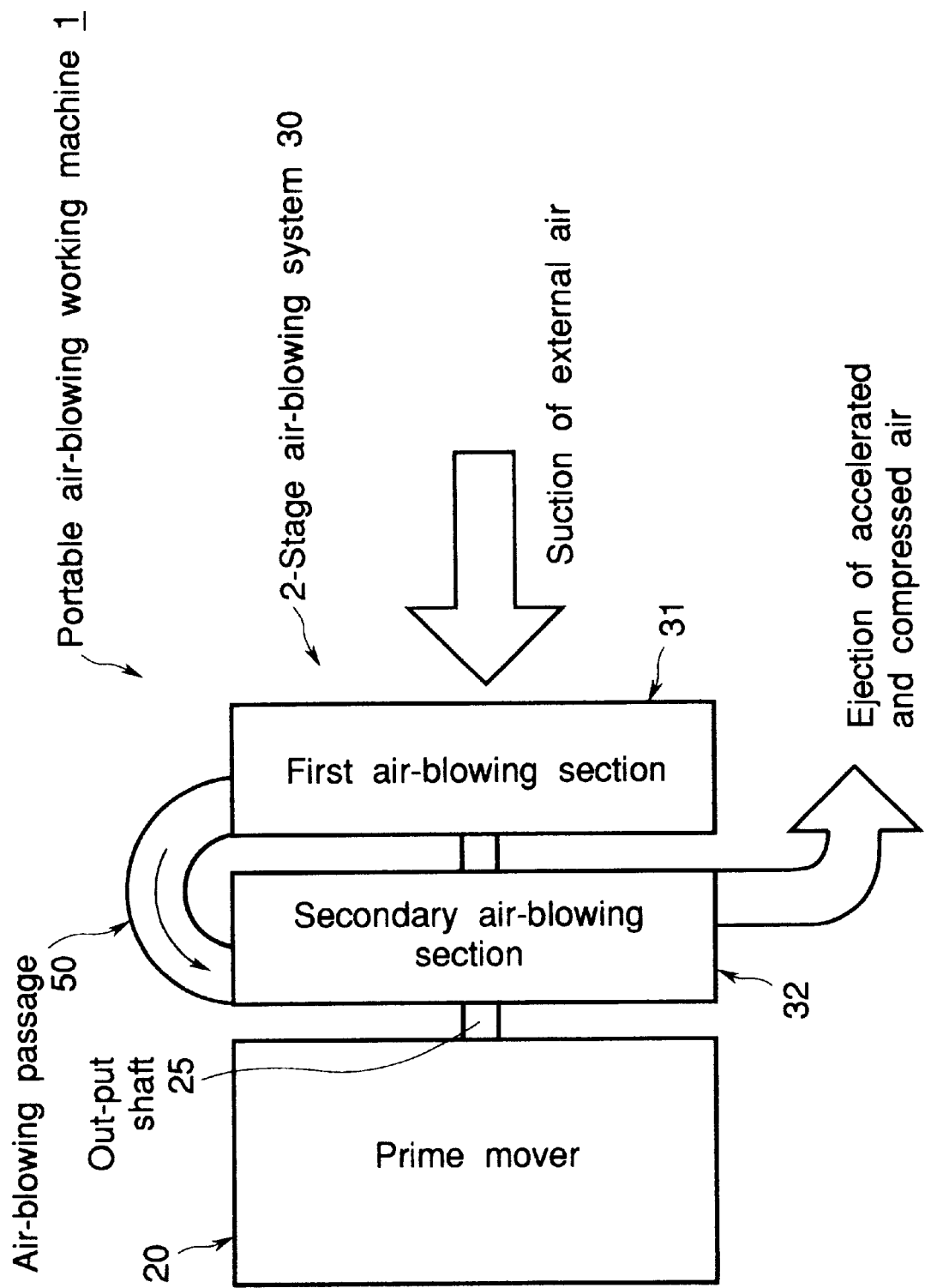
FIG. 1 is a diagram schematically illustrating the basic structure of one embodiment of a portable air-blowing working machine according to the invention.
Figure 2:
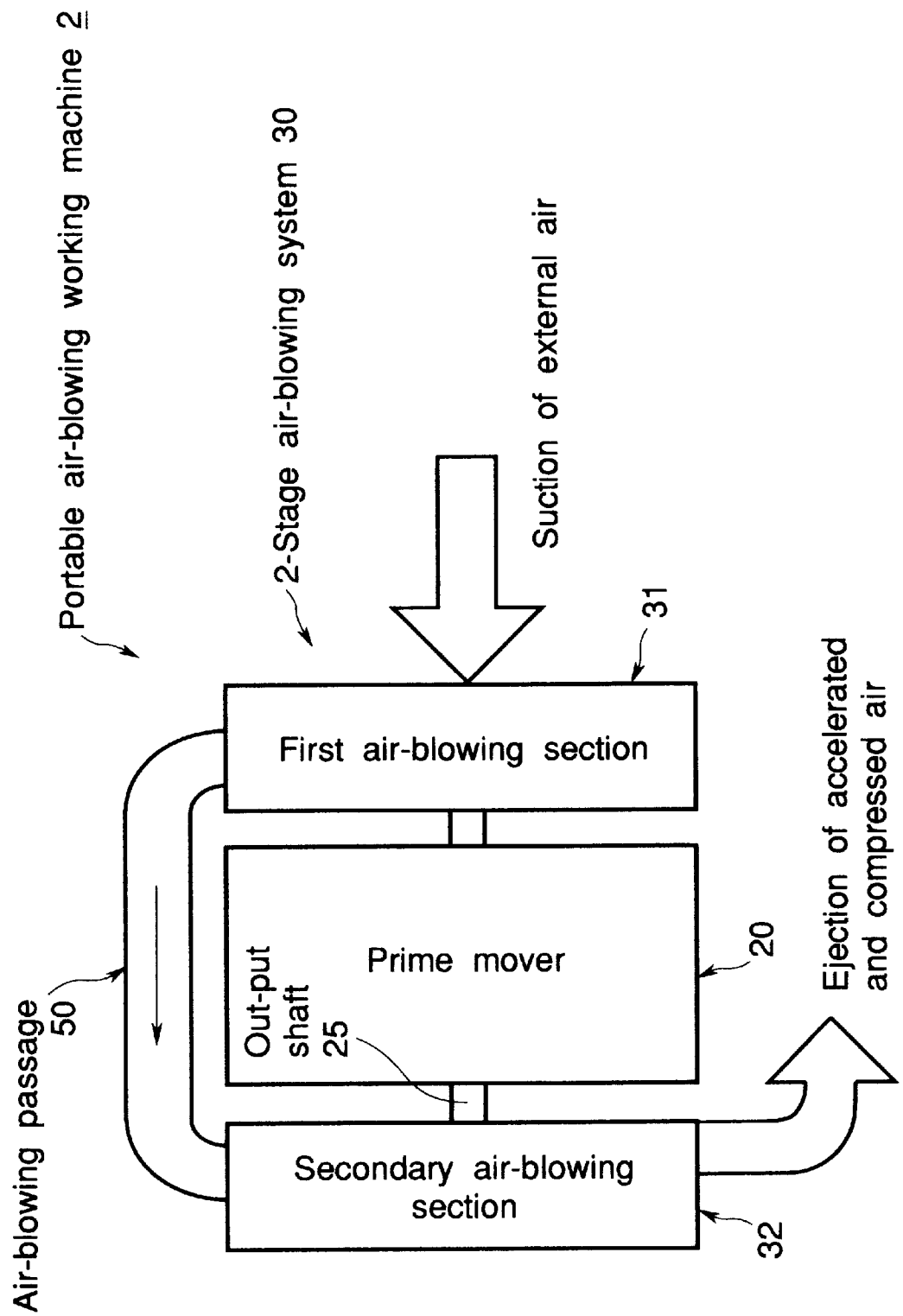
FIG. 2 is a diagram schematically illustrating the basic structure of another embodiment of a portable air-blowing working machine according to the invention.
Figure 3:
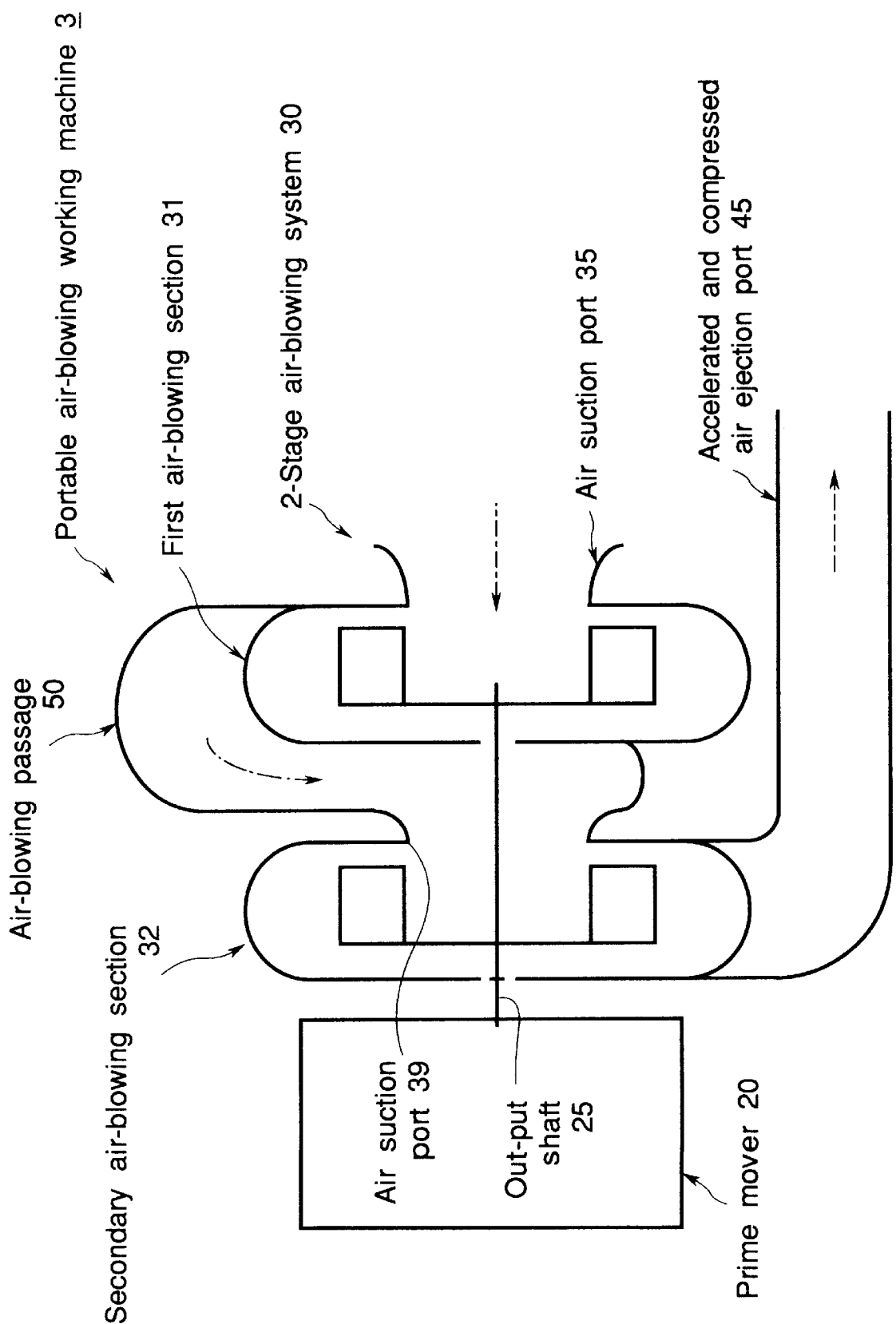
FIG. 3 is a diagram schematically illustrating a preferred structure of the portable air-blowing working machine according to the invention.
Figure 4:
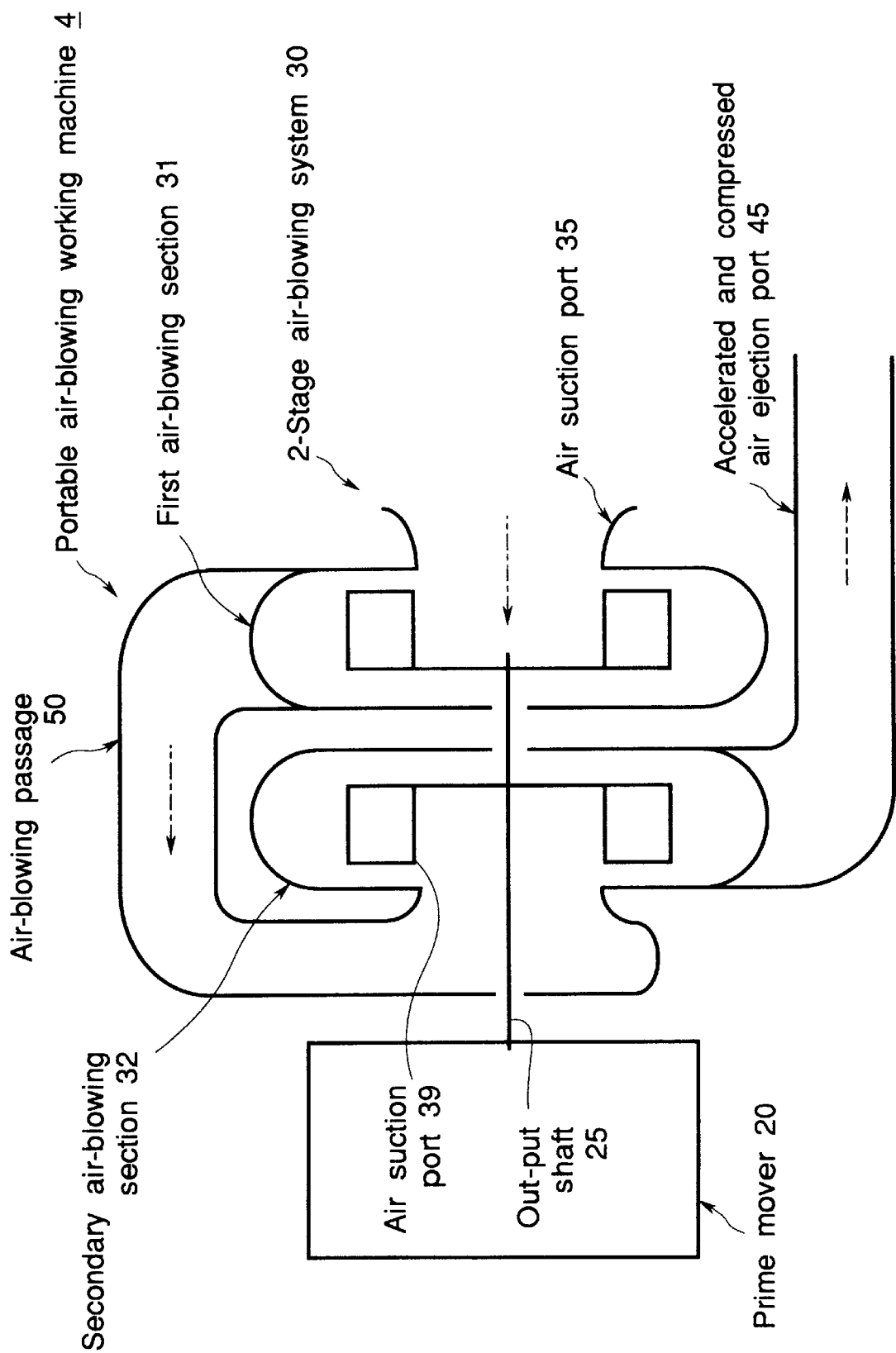
FIG. 4 is a diagram schematically illustrating another preferred structure of the portable air-blowing working machine according to the invention.
Figure 5:
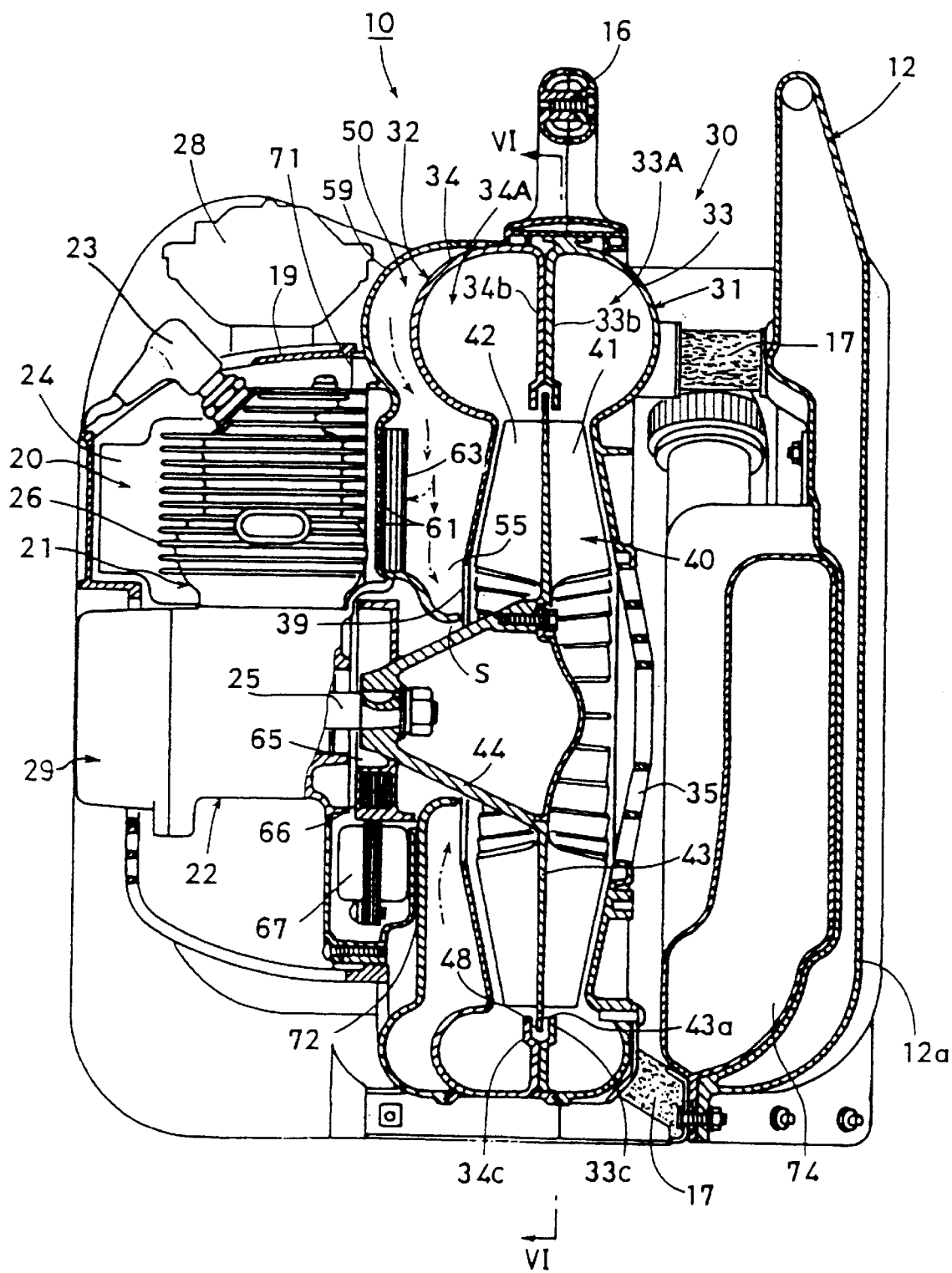
FIG. 5 is a longitudinal sectional view illustrating one embodiment of a portable air-blowing cleaner representing one example of the portable air-blowing working machine according to the invention.
Figure 9:
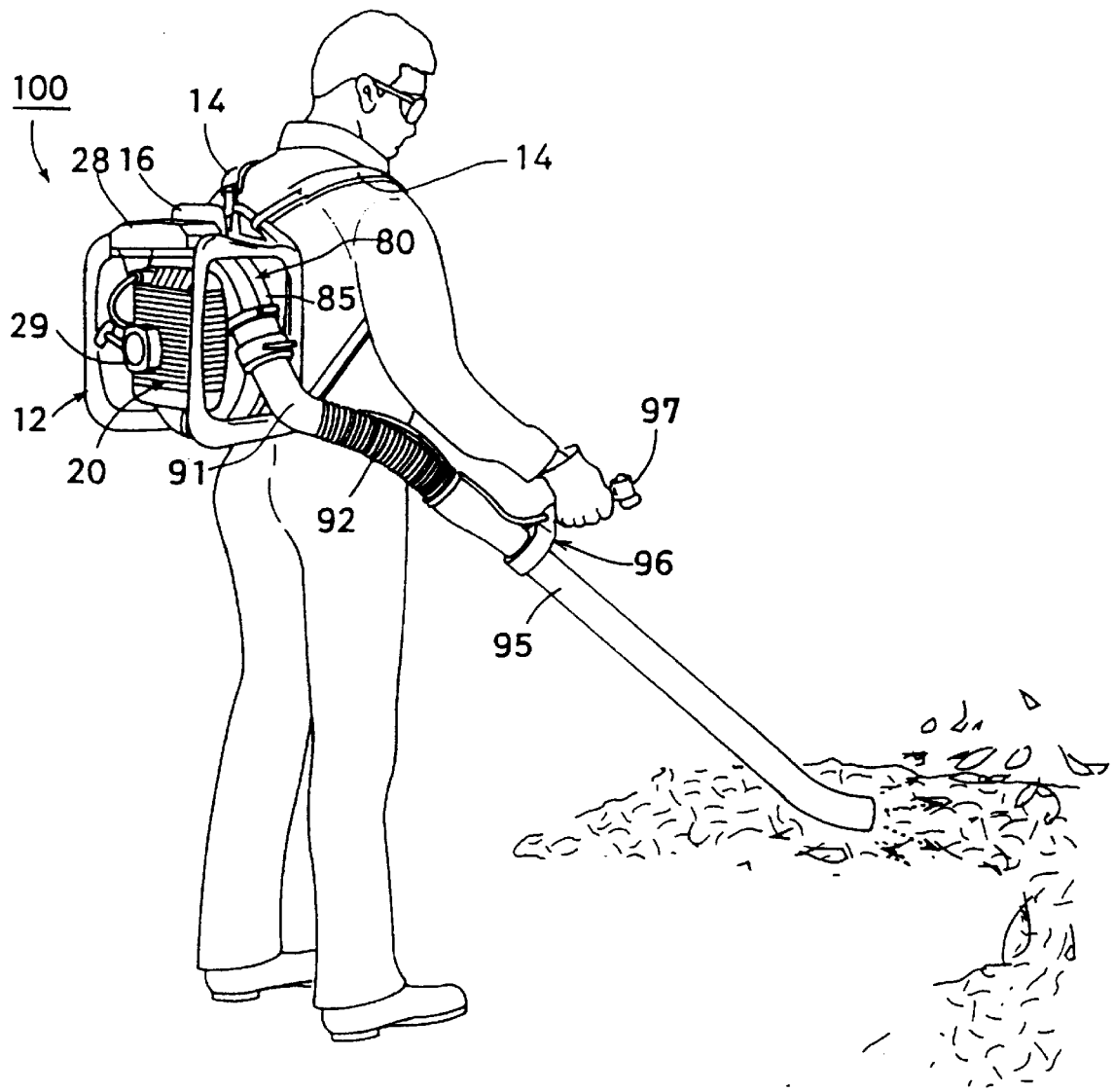
FIG. 9 is a perspective view illustrating a conventional portable air-blowing cleaner and its use in clearing debris.

FIG. 5 illustrates one embodiment of a portable air-blowing cleaner representing one example of the portable air-blowing working machine according to the invention. The portable air-blowing cleaner 10 shown in FIG. 5 is substantially the same as the conventional portable air-blowing cleaner 100 shown in FIG. 9, except for the construction of the air blowing system 30 thereof. Thus, the portable air-blowing cleaner 10 is also designed to gather scattered debris such as fallen leaves, dust, and the like, whereby the cleaner 10 can be used in place of a conventional broom.

The portable air-blowing cleaner 10 is provided with a U-shaped (in plan view) shouldering frame 12 to which a pair of shouldering straps (not shown) are connected. An air blowing system 30 of two-stage construction, comprising a centrifugal first air-blowing section 31, a centrifugal secondary air-blowing section 32, and an air-blowing passage 50 for communicating the first air-blowing section 31 with the secondary air-blowing section 32, is attached via a plurality of vibration-damping pads 17 to the back-contacting portion 12a of the shouldering frame 12.

On the rear side (the left side of FIG. 5) of the air blowing system 30, an air-cooled two-stroke gasoline engine 20, functioning as a prime mover, is vertically mounted (positioned upright) for rotatably driving the first air-blowing section 31 and the secondary air-blowing section 32. Further, a fuel tank 74 for the engine 20 is interposed between the back-contacting portion 12a of the shouldering frame 12 and the air blowing system 30.

The engine 20 comprises a cylinder 21 provided with a large number of cooling fins 26 and a crankcase 22 axially supporting a crank shaft 25. An air cleaner 28 is mounted on the top of the engine 20, and a carburetor 24 is mounted on the side of the engine 20. The cylinder 21, crankcase 22 and carburetor 24 are all covered by a covering member 19.

An ignition spark plug 23 is attached to the head of the cylinder 21. A flywheel 65 in which a magnet 66 is internally mounted and a cone-shaped hub 44 of a double fan 40 (to be explained hereinafter) are both fixed to the forward end portion of the crankshaft 25 (i.e. in the vicinity of the air blowing system 30), so that the flywheel 65 and the cone-shaped hub 44 are free to rotate integrally with the crank shaft 25. An ignition coil 67 is disposed below the crank shaft 25 so as to face the magnet 66. A recoil starter 29 is attached to the rear end portion of the crankcase 22. Further, a hand grip 16 projects from the top of the air blowing system 30 for the convenience of carrying the cleaner 10.

The air blowing system 30 is fundamentally composed of the centrifugal first air-blowing section 31, the centrifugal secondary air-blowing section 32 and the air-blowing passage 50 which is designed to communicate the first and second stage air-blowing sections 31 and 32 with each other. Namely, the air-blowing system 30 is designed such that the external air is drawn through a space between the air blowing system 30 and the fuel tank 74 into the air-intake port 35 of the first air-blowing section 31, wherein the air is increased in velocity and pressure. The air is then continuously discharged via the air-blowing passage 50 into the air-intake port 39 of the secondary air-blowing section 32, within which the air is further accelerated and compressed before being finally discharged to the atmosphere.

In this embodiment, both the first air-blowing section 31 and the secondary air-blowing section 32 are arranged such that the air-intake ports 35 and 39 thereof face, i.e., open, in opposite directions relative to each other in the axial direction of the crank shaft 25. So arranged, the first air-blowing section 31 and the secondary air-blowing section 32 are coupled to each other in a back-to-back configuration and communicate with each other via the air-blowing passage 50.

The fan portion of each of the first air-blowing section 31 and the secondary air-blowing section 32 is constituted by a common unitary double fan 40, which comprises a fore-fan blade 41 and a rear-fan blade 42 that are respectively mounted on the fore and rear faces of a main disk plate 43. The plate 43 is integrally connected via the cone-shaped hub 44 to the crank shaft 25 of the engine 20.

The fore-fan blade 41 and the rear-fan blade 42 are both constituted respectively by backward curved fan-blades 41, which are rearwardly inclined relative to the direction of rotation of the main plate 43 (indicated by the arrow P in FIG. 6), and are mirror-symmetrical to each other with respect to the main plate 43.

The volute case 33 of the first air-blowing section 31 and the volute case 34 of the secondary air-blowing section 32 are provided at the center of the axially outward surfaces thereof with the circular air-intake ports 35 and 39, respectively, the center of the air intake ports 35 and 39 being coaxial with the axis of the crank shaft 25. At the outer circumferential portions thereof, the volute cases 33 and 34 define volute chambers 33A and 34A, respectively. A pair of plate portions 33b and 34b constituting the rear faces of the outer circumferential portions of the volute chambers 33A and 34A, respectively, are contacted with each other to form a partition wall. The inner circumferential end portions 33c and 34c of the partition wall plates 33b and 34b are bent axially away from each other, thereby forming a U-shaped groove 48. The outer peripheral portion 43a of the main plate 43 of the double fan 40 is radially extended beyond the peripheries of the fan blades 41 and 42, such that the extended outermost peripheral portion 43a of the plate 43 extends into the U-shaped groove 48 and forms therewith a labyrinth seal.

Figure 6:
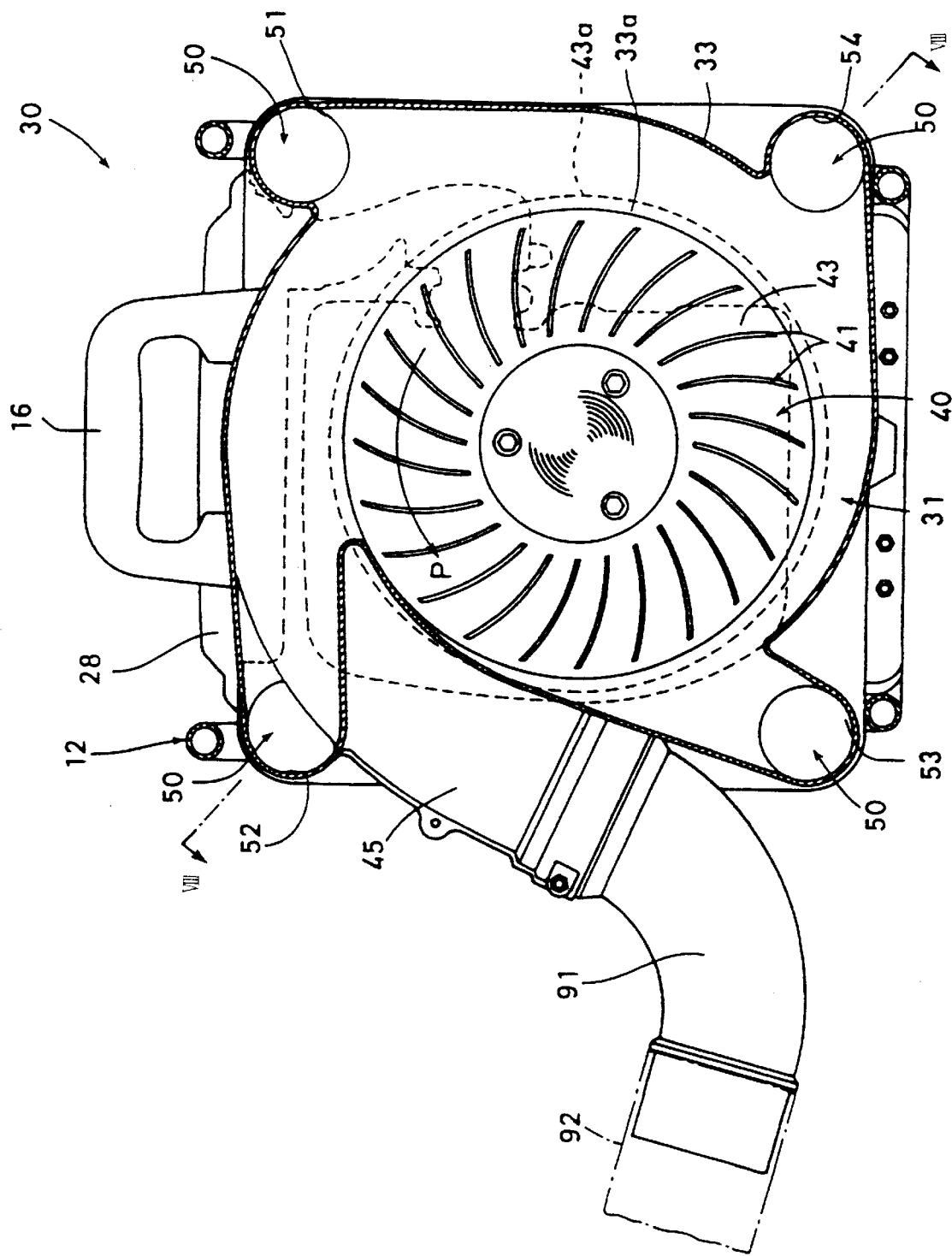
FIG. 6 is a cross-sectional view taken along the line VI—VI of FIG. 5.
Figure 7:
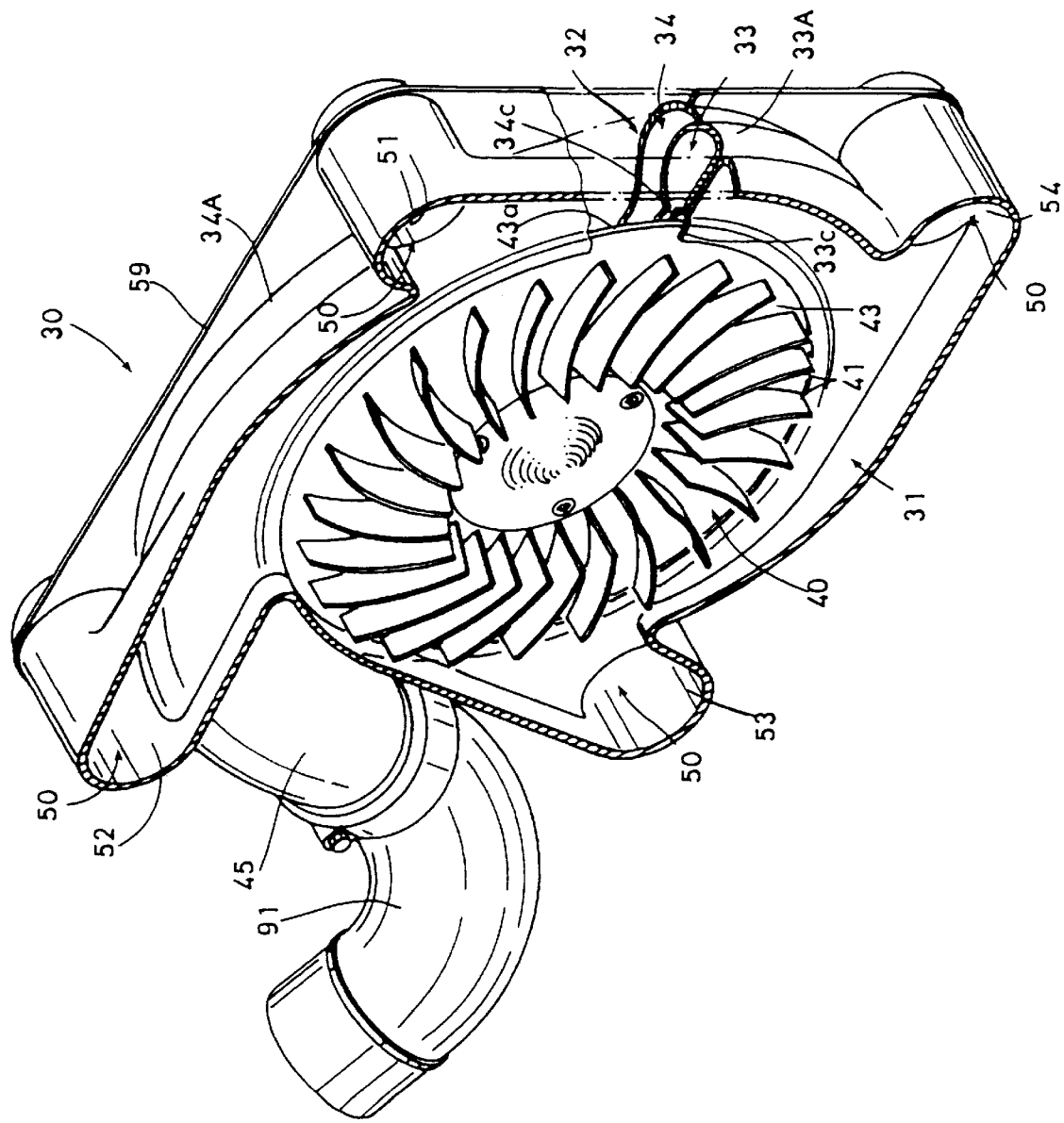
FIG. 7 is a partially sectioned perspective view illustrating an air-blowing mechanism of the portable air-blowing cleaner shown in FIG. 5.
Figure 8:
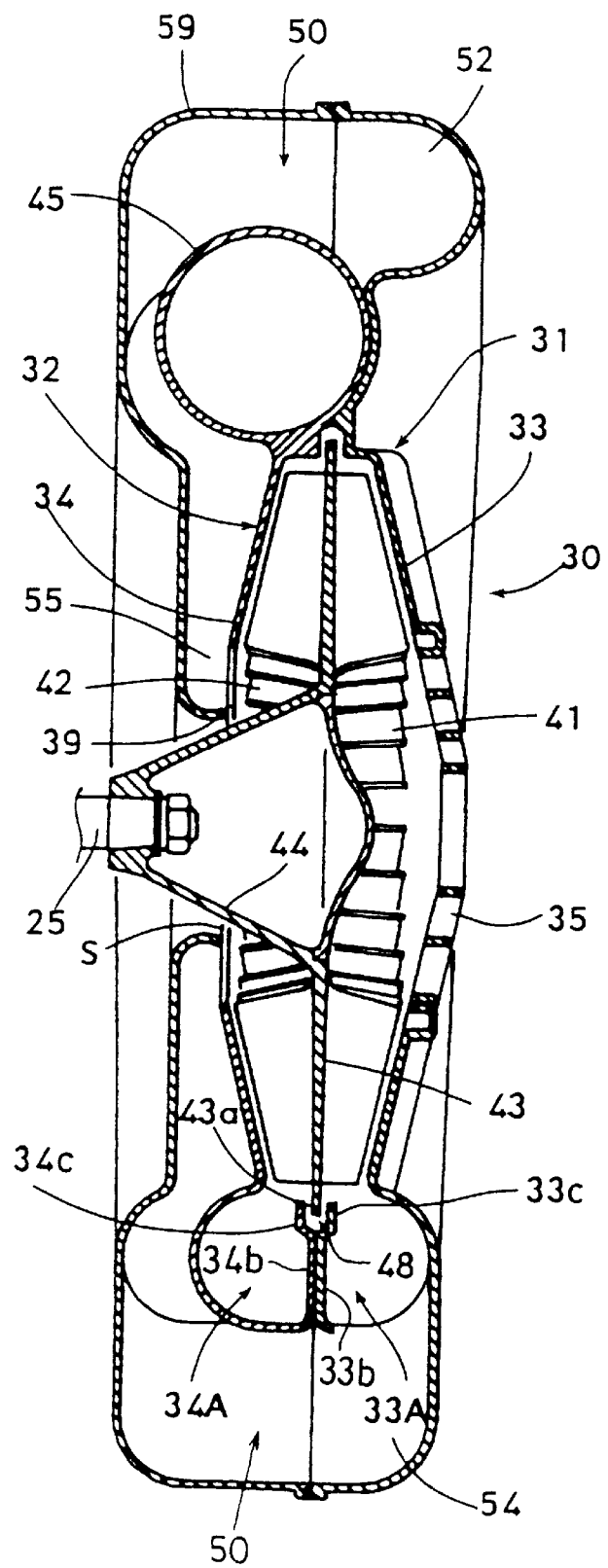
FIG. 8 is a cross-sectional view taken along the line VIII—VIII of FIG. 6.

As clearly shown in FIGS. 6 to 8, the air-blowing passage 50 is defined by the volute case 34 of the secondary air-blowing section 32 and by a box-type rigid passage-forming member 59 which is connected with the volute case 34. The inlet portions 51 to 54 of the air-blowing passage 50 are respectively positioned at the four corners of the outer circumferential portion of the volute chamber 33A of the first air-blowing section 31. Correspondingly, each outlet portion 55 of the air-blowing passage 50 is positioned near the air-intake port 39 of the secondary air-blowing section 32, thus forming substantially four passageways which are ultimately joined in the vicinity of the second-stage air-intake port 39.

In order to avoid any interference with the air-blowing passage 50, the air-discharge port 45 of the secondary air-blowing section 32 is disposed at an intermediate portion between the neighboring inlet portions 52 and 53 of the air-blowing passage 50 so as to extend obliquely downward from a region near the armpit of an operator shouldering the portable air-blowing cleaner 10. To this air-discharge port 45 are successively connected, as in the case of the conventional cleaner shown in FIG. 9, a bent pipe 91 which is variable in direction, a bellows type flexible pipe 92 and an exhaust pipe 95 provided with an operating handle 96.

As shown in FIGS. 5 and 8, the air-blowing passage 50 is disposed in the space between the engine 20 and the secondary air-blowing section 32. The engine 20 is secured, through the coupling portions 71 and 72 of the covering member 19, to the passage-forming member 59 defining the air-blowing passage 50.

A large number of through-holes constituting a cooling air intake 61 for directing cooling air towards the engine 20 are formed at a portion of the passage-forming member 59 neighboring the cylinder 21 of the engine 20. A cooling air adjuster 63, which comprises for instance a grill or a guiding plate for adjusting the quantity and direction of cooling air to the engine 20 is disposed at the cooling air intake 61.

Since the air blowing system 30 is constituted by a two-stage system comprising the first air-blowing section 31 and the secondary air-blowing section 32 in the portable air-blowing working machine according to this embodiment as mentioned above, even if the revolution speeds of the prime mover 20 and the air-blowing sections 31 and 32 are lowered (for example, lowered by 17%) as compared to those of the prior art single-stage air-blowing mechanism, an air-blowing performance comparable to the air-blowing mechanism of the prior art can still be obtained by the portable air-blowing working machine of this embodiment. Accordingly, the noise generated by the air-blowing sections 31 and 32 and by the prime mover 20 can be drastically reduced (for example, reduced by about 3dB(A)). At the same time, the vibration produced by the portable air-blowing working machine can also be reduced.

Furthermore, since the normal revolution speed of the prime mover 20 can be lowered according to the invention, wear of the moving parts of the machine can be also minimized, thus making it possible to prolong the life of the machine.

Since the vibration of the machine can be reduced in addition to the reduction of noise, operator fatigue can be also alleviated.

Therefore, as compared with the conventional countermeasures to cover the air blower entirely with a covering member lined with a noise-damping material, this embodiment is more advantageous in that the reduction of noise can be effectively accomplished and, at the same time, maintenance and inspection of the machine can be easily performed.

In particular, since both the first air-blowing section 31 and the secondary air-blowing section 32 are coupled to each other in a back-to-back configuration, any dimensional increase in the axial direction of the machine can be minimized as compared with a connecting system where the first air-blowing section 31 and the secondary air-blowing section 32 are coupled to each other in series.

Further, since the fan portions of both the first air-blowing section 31 and the secondary air-blowing section 32 are constituted by a common unitary double fan 40, the size in the axial direction of the air blower can be further minimized. At the same time, any increase in weight can be also minimized as compared to the case where two fan units are separately employed. Additionally, savings are realized in the number and manufacturing cost of the parts required, as well as assuring a reliable and easy mounting operation of the fan portion 30 on the crank shaft 25.

Also, since the static pressure can be increased, the diameter of the air-discharge port 45 and of the pipes connected therewith can be minimized, thus making it possible to reduce the size and weight of the machine as a whole.

Additionally, since a labyrinth seal is formed between the volute cases 33 and 34 of the first air-blowing section 31 and the secondary air-blowing section 32, on the one hand, and the outer periphery 43a of the main plate 43 of the double fan 40, on the other hand, a back-flow of air from the secondary air-blowing section 32 towards the first air-blowing section 31 can be effectively prevented, thus making it possible to enhance the air-feeding efficiency.

Since the inlet portions 51 to 54 of the air-blowing passage 50 are respectively positioned at the four corners of the outer circumferential portion of the volute chamber 33A of the first air-blowing section 31 and since the rear half portions of the air-blowing passage 50 are interposed between the engine 20 and the secondary air-blowing section 32 with the terminal portions (outlet portions) 55 thereof being joined together around the air-intake port 39 of the secondary air-blowing section 32, the total cross-sectional area of the air-blowing passage 50 can be increased, thus making it possible to prevent as much as possible a reduction in the air-feeding efficiency while, at the same time, minimizing any increase in the external dimensions of the air blower. As a result, the air blower can be made compact and desirable in external design.

Since the air-discharge port 45 of the secondary air-blowing section 32 is disposed at an intermediate portion between the neighboring inlet portions 52 and 53 of the air-blowing passage 50 (for the purpose of avoiding any interference with the air-blowing passage 50), any increase in the external dimension of the air blower can likewise be minimized. As a result, the air blower can be made compact without any deterioration in air-blowing performance or in workability.

Because the passage-forming member 59 defining the air-blowing passage 50 is constructed of a rigid box-like structure and the engine 20 is secured thereto, it is possible to realize a frameless monocoque structure. Therefore, it is possible in this respect to further minimize any increase in size or weight.

Further, since a large number of through-holes constituting a cooling air intake 61 for feeding cooling air to the engine 20 is formed at a portion of the passage-forming member 59 neighboring the cylinder 21 of the engine 20, part of the air flowing through the air-blowing passage 50 is directed through the cooling air intake 61 onto the circumferential wall of the cylinder 21 of the engine 20, thus making it possible to effectively cool the engine 20. As a result, a separate cooling fan is not required to be mounted on the cleaner, thus avoiding the manufacturing cost and additional weight of the cooling fan. Also, as the cooling air adjuster 63 for adjusting the quantity and direction of cooling air to the engine 20 is disposed at the cooling air intake 61, the cooling air can be fed to the engine 20 under desired and optimum conditions.

As shown in FIG. 8, a space or clearance S is inevitably formed between the rotatable hub 44 of the double fan 40 in this embodiment and the stationary passage-forming member 59. Part of the air flowing through the air-blowing passage 50 will be leaked from this space S towards the crankcase 22. This leaked air is utilized as cooling air for the crankcase 22, thus functioning to enhance the charging efficiency of the engine 20. The loss due to this air leakage may, therefore, be disregarded. Furthermore, the space S may be set to a fairly large size taking manufacturing tolerances and an elastic deformation during operation into account. Thus, any strict dimensional precision in the size of the space S is not required, making it possible to reduce manufacturing costs.

In the foregoing explanation, the invention has been explained with reference to one specific embodiment. However, the invention should not be construed to be limited by this embodiment, but may be variously modified within the spirit and scope of the invention as claimed in the appended claims.

For example, the invention is not limited to the portable air-blowing cleaner 10 as set forth in the above embodiment, but can be applied to other kinds of portable air-blowing working machines, such as a portable spraying machine. Also, the portable air-blowing working machine need not be of the shouldering type, but may be a portable air-blowing working machine of the hand-carried type, shoulder-hanging type or handcart-attached type.

As for the prime mover, it is not limited to an air-cooled two-stroke gasoline engine but may be other kinds of engine or an electric motor.

As would be clearly understood from the aforementioned explanations, it is possible according to this invention to provide a portable air-blowing working machine which is capable of drastically minimizing the noise from the machine while assuring a desired air discharge performance and, at the same time, minimizing any increase in weight and external size of the machine.

What is claimed is:

1. A portable air-blowing working machine, comprising:
   a prime mover having a rotatable output drive shaft;
   a centrifugal first-stage air-blowing section driven by said rotatable output drive shaft for drawing in external air and increasing the velocity and pressure thereof;
   at least one air-discharge outlet in said centrifugal first-stage air-blowing section;
   a centrifugal second-stage air-blowing section driven by said rotatable output drive shaft for receiving air discharged from said air-discharge outlet and further increasing the velocity and pressure thereof;
   an air-blowing passage interconnecting said at least one air-discharge outlet of said centrifugal first-stage air-blowing section with said centrifugal second-stage air-blowing section for communicating air discharged from said centrifugal first-stage air-blowing section to said centrifugal second-stage air-blowing section; and
   an air-discharge port for discharging air from said centrifugal second-stage air-discharge section to the atmosphere.

2. The portable air-blowing working machine according to claim 1, wherein:
   said first-stage air-blowing section and said second-stage air-blowing section have respective air-intake ports arranged such that said respective air-intake ports open facing in the same axial direction relative to the axis of said output shaft; and
   said first-stage air-blowing section and said second-stage air-blowing section are coupled to each other in series, with said air-blowing passage leading from said at least one air-discharge outlet of said first-stage air-blowing section to said air-intake port of said second-stage air-blowing section.

3. The portable air-blowing working machine according to claim 1, wherein;
   said first-stage air-blowing section and said second-stage air-blowing section have respective air-intake ports and are arranged such that said respective air-intake ports thereof open facing in opposite axial directions relative to the axis said output drive shaft; and
   said first-stage air-blowing section and said second-stage air-blowing section are coupled to each other in a back-to-back configuration, with said air-blowing passage leading from said at least one air-discharge outlet of said first-stage air-blowing section to said air-intake port of said second stage air-blowing section.

4. The portable air-blowing working machine according to any one of claims 1 to 3, wherein:
   said prime mover is an air-cooled two-stroke gasoline engine; and
   said first-stage air-blowing section and said second-stage air-blowing section are drivingly connected to a rotatable output drive shaft of said engine.

5. A portable air-blowing working machine, comprising:
   a prime mover having a rotatable output shaft;
   a first-stage air-blowing section having an air-intake port, a centrifugal fan drivably connected to said output shaft and an at least one air-discharge outlet;

a second-stage air-blowing section having an air-intake port, a centrifugal fan drivably connected to said output shaft and an air discharge outlet; and an air-blowing passage communicating with said at least one air-discharge outlet of said first-stage air-blowing section and said air-intake port of said second-stage air-blowing section for conveying air discharged from said first-stage air-blowing section to said second-stage air-blowing section.

6. The portable air-blowing machine according to claim 5, wherein:

said first-stage air-blowing section and said second-stage air-blowing section are arranged back-to-back in the axial direction of said drive shaft, with said second-stage air-blowing section being adjacent to said prime mover; and said air-intake ports of said first-stage air-blowing section and said second-stage air-blowing section open in opposite axial directions.

7. The portable air-blowing machine according to claim 6, wherein:

said air-intake ports of said first-stage air-blowing and said second-stage air-blowing section are located adjacent said output shaft;

said at least one air-discharge outlet of said first-stage air-blowing section is located adjacent the circumferential periphery of said first stage air-blowing section; and said air-blowing passage extends radially inwardly and axially between said prime mover and said second-stage air-blowing section to communicate air discharged from said at least one air-discharge outlet of said first-stage air-blowing section to said air-intake port of said second-stage air-blowing section.

8. The portable air-blowing machine according to claim 6, wherein:

said first-stage air-blowing section and said second-stage air-blowing section are axially separated by a common radially extending main disk plate, said common disk plate being rotatably driven by said output shaft; and said centrifugal fans of said first-stage air-blowing section and said second-stage air-blowing section are carried back-to-back on opposite axial sides of said common disk plate.

9. The portable air-blowing machine according to claim 8, wherein:

said first-stage air-blowing section and said second-stage air blowing section form a circumferential groove that opens radially inwardly towards the axis of said output shaft; and the radially outer periphery of said common disk plate extends into said circumferential groove and defines therewith a labyrinth seal.

* * * * *